(12) United States Patent
Yamamoto et al.

(10) Patent No.: US 8,257,880 B2
(45) Date of Patent: Sep. 4, 2012

(54) FUEL CELL AND GAS SEPARATOR FOR FUEL CELL

(75) Inventors: Yoshinori Yamamoto, Toyota (JP); Toshiyuki Suzuki, Toyota (JP); Haruyuki Aono, Nagoya (JP); Junichi Shirahama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/354,675

(22) Filed: Jan. 20, 2012

(65) Prior Publication Data

US 2012/0115051 A1    May 10, 2012

Related U.S. Application Data

(62) Division of application No. 12/531,366, filed as application No. PCT/JP2008/071186 on Nov. 17, 2008.

(30) Foreign Application Priority Data

Nov. 27, 2007 (JP) ................... 2007-305732

(51) Int. Cl.
*H01M 8/04* (2006.01)
*H01M 2/38* (2006.01)

(52) U.S. Cl. ......... 429/514; 429/512; 429/513; 429/457
(58) Field of Classification Search .......... 429/512–514, 429/456, 457
See application file for complete search history.

(56) References Cited

U.S. PATENT DOCUMENTS 7,378,167 B2   5/2008   Mizuno

FOREIGN PATENT DOCUMENTS

| JP | 06-267559 A | 9/1994 |
| JP | 2003-142126 A | 5/2003 |
| JP | 2004-146145 A | 5/2004 |
| JP | 2004-247061 A | 9/2004 |
| JP | 2005-108505 A | 4/2005 |
| JP | 2005-317311 A | 11/2005 |
| JP | 2006-236612 A | 9/2006 |
| JP | 2008-021515 A | 1/2008 |
| JP | 2008-293743 A | 12/2008 |
| WO | 2006/075786 A1 | 7/2006 |
| WO | 2007/069440 A1 | 6/2007 |

OTHER PUBLICATIONS

International Search Report of PCT/JP2008/071186 mailed Mar. 3, 2009.

*Primary Examiner* — Carlos Barcena
(74) *Attorney, Agent, or Firm* — Kenyon & Kenyon LLP

(57) ABSTRACT

In at least one of flow distribution areas 35 provided on a separator 15, plurality of first projections 46 formed in a region corresponding to a first section (parted regions 32a and 32c) of a center area (including parted regions 32a through 32c) having a relatively high flow rate of a first fluid (refrigerant) are designed to have a larger diameter of a cross section than plurality of first projections 46 formed in a region corresponding to a second section (parted region 32b) of the center area having a relatively low flow rate of the first fluid. This arrangement effectively attains a substantially uniform flow rate distribution of a fluid in a fluid flow path formed on a separator, which is configured to have concavo-convex structures formed in a mutually reversed relation on two opposed sides thereof.

7 Claims, 9 Drawing Sheets

GAS FLOW PATH SIDE

REFRIGERANT FLOW PATH SIDE

GAS FLOW PATH SIDE

REFRIGERANT FLOW PATH SIDE

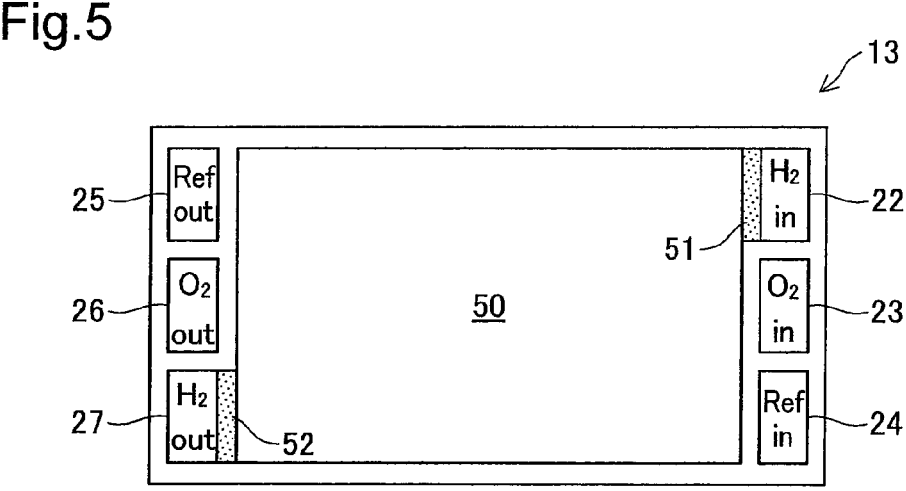
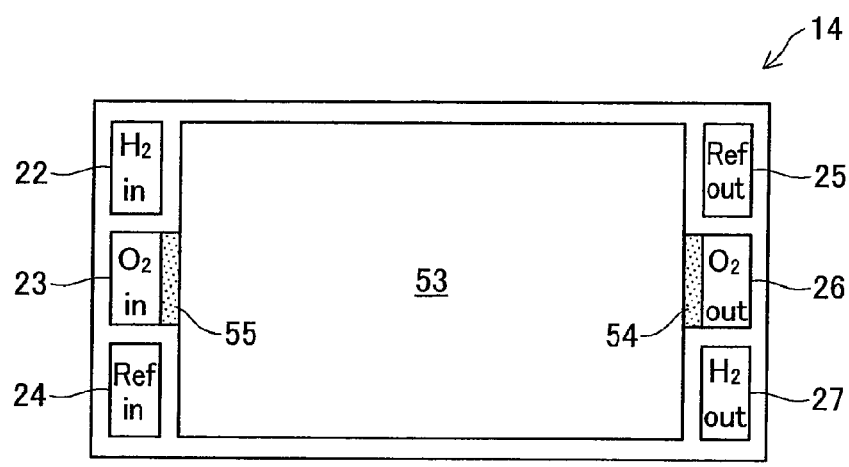

GAS FLOW PATH SIDE

REFRIGERANT FLOW PATH SIDE

GAS FLOW PATH SIDE

EFRIGERANT FLOW PATH SIDE

GAS FLOW PATH SIDE

REFRIGERANT FLOW PATH SIDE

GAS FLOW PATH SIDE

REFRIGERANT FLOW PATH SIDE

US 8,257,880 B2

FUEL CELL AND GAS SEPARATOR FOR FUEL CELL

This is a division of U.S. application Ser. No. 12/531,366 filed 15 Sep. 2009, which is a 371 national phase of PCT/JP2008/071186 filed 17 Nov. 2008, which claims priority to Japanese Patent Application No. 2007-305732 filed 27 Nov. 2007, the entire contents of which are incorporated herein by reference

TECHNICAL FIELD

The present invention relates to a fuel cell and a gas separator for the fuel cell.

BACKGROUND ART

A known structure of a separator used for fuel cells is configured to have concavo-convex structures formed in a mutually reversed relation on two opposed sides thereof and define flow paths of different fluids on the respective sides (see, for example, Japanese Patent Laid-Open No. 2003-142126). Holes for defining manifolds of supplying and discharging a fluid from and to the corresponding side of the separator are generally provided in an outer circumferential area of the separator. The flow path formed on each side of the separator is thus designed to have a specific shape for communicating a supply manifold and a discharge manifold of the corresponding fluid and introducing the fluid on the side of the separator. The relevant prior art techniques have been disclosed in Japanese Patent Application No. 2006-519715 (International Publication No. 06/075786) and Japanese Patent Laid-Open No. 2005-108505.

The layout of a supply manifold and a discharge manifold of each fluid is determined according to various factors. In some layout of the fluid manifolds, there may be a non-uniform flow rate distribution of the fluid in the fluid flow path formed on the side of the separator. In the separator configured to have the concavo-convex structures in the mutually reversed relation on the two opposed sides thereof, the shape of the fluid flow path formed on each side is restricted by the shape of the concavo-convex structure for defining the fluid flow path on the other side. The mutual restriction of the shapes of the concavo-convex structures on the opposed sides of the separator makes it difficult to solve the non-uniformity problem of the flow rate distribution of the fluid caused by the layout of the fluid manifolds. Equalization of the flow rate distribution of the fluid is accordingly required in the separator configured to have the concavo-convex structures formed in the mutually reversed relation on the two opposed sides thereof.

DISCLOSURE OF THE INVENTION

In order to solve the problem of the prior art discussed above, there would thus be a demand for substantially equalizing a flow rate distribution of a fluid in a fluid flow path formed on a separator, which is configured to have concavo-convex structures formed in a mutually reverse relation.

The present invention accomplishes at least part of the demand mentioned above and the other relevant demands by variety of configurations and arrangements discussed below.

According to a first aspect, the invention is directed to a gas separator for a fuel cell configured to have concavo-convex structures formed in a mutually reversed relation on two opposed sides thereof and to define a flow path for a first fluid on a first side thereof and a flow path for a second fluid on a second side thereof. The gas separator of the first aspect of the invention includes: a center area designed to have therein multiple linear convexes, which are extended in a first direction to introduce the first fluid and the second fluid in the first direction on the respective opposed sides and are arranged to make a flow of the first fluid in one fixed direction on at least the first side, the center area being arranged to cause non-uniformity of a flow rate distribution of the first fluid based on a relation to a flow direction of the first fluid on the first side; and flow distribution areas arranged across the center area to be adjacent to respective ends of the multiple linear convexes and designed to have multiple first projections of a substantially circular cross section that are protruded from the first side to be arranged apart from one another at a preset interval, and multiple second projections that are protruded from the second side to be arranged apart from one another, each of the flow distribution areas being structured to make a flow of the first fluid to be supplied from or discharged to the flow path of the first fluid formed in the center area on the first side. In at least one of the flow distribution areas, plurality of the first projections formed in a region corresponding to a first section of the center area having a relatively high flow rate of the first fluid are designed to have a larger diameter of the cross section than plurality of the first projections formed in a region corresponding to a second section of the center area having a relatively low flow rate of the first fluid.

In the gas separator for the fuel cell according to the first aspect of the invention, the presence of the plurality of the first projections designed to have the larger diameter of the cross section increases the flow path resistance in the region of the flow distribution area corresponding to the first section of the center area. The increased flow path resistance in this region restricts the flow rate of the first fluid in the region of the flow distribution area with the plurality of the first projections of the larger diameter cross section, as well as a supply amount or a discharge amount of the first fluid from or to the first section of the center area via the region of the flow distribution area with the plurality of the first projections of the larger diameter cross section. Such restriction relatively increases the flow rate of the first fluid in the region of the flow distribution area with the plurality of the first projections of the smaller diameter cross section, as well as a supply amount or a discharge amount of the first fluid from or to the second section of the center area via the region of the flow distribution area with the plurality of the first projections of the smaller diameter cross section. This arrangement accordingly makes a substantially uniform flow rate distribution of the first fluid over the whole flow path of the first fluid including the center area and the flow distribution areas. In the gas separator for the fuel cell according to the first aspect of the invention, the non-uniformity of the flow rate distribution of the first fluid on the first side may be determined by a positional relation of the flow path of the first fluid in the center area to a port of supplying or discharging the first fluid from or to each of the flow distribution areas.

In one preferable application of the gas separator for the fuel cell according to the first aspect of the invention, the first fluid on the first side is made to flow from one end section in a direction perpendicular to the first direction of one of the flow distribution areas or one flow distribution area to an opposed end section in the direction perpendicular to the first direction of the other of the flow distribution areas or the other flow distribution area. In the one flow distribution area, plurality of the first projections formed in a region close to the opposed end section in the direction perpendicular to the first direction are designed to have a larger diameter of the cross section than plurality of the first projections formed in another region. In the other flow distribution area, plurality of the first projections formed in a region close to the one end section in the direction perpendicular to the first direction are designed to have a larger diameter of the cross section than plurality of the first projections formed in another region.

In the gas separator of this application, according to the relation to the flow direction of the first fluid, the first section of the center area having the relatively high flow rate of the first fluid is both end sections of the center area in the direction perpendicular to the first direction. The supply amount or the discharge amount of the first fluid from or to the first section of the center area is restricted in the region of the flow distribution area with the plurality of the first projections of the larger diameter cross section. This arrangement effectively equalizes the flow rate distribution of the first fluid over the whole flow path of the first fluid.

In another preferable application of the gas separator for the fuel cell according to the first aspect of the invention, the first fluid on the first side is made to flow from a central section in a direction perpendicular to the first direction of one of the flow distribution areas or one flow distribution area to a central section in the direction perpendicular to the first direction of the other of the flow distribution areas or the other flow distribution area. In each of the flow distribution areas, plurality of the first projections formed in a region close to the central section in the direction perpendicular to the first direction are designed to have a larger diameter of the cross section than plurality of the first projections formed in a region close to an end section in the direction perpendicular to the first direction.

In the gas separator of this application, according to the relation to the flow direction of the first fluid, the first section of the center area having the relatively high flow rate of the first fluid is a central section of the center area in the direction perpendicular to the first direction. The supply amount or the discharge amount of the first fluid from or to the first section of the center area is restricted in the region of the flow distribution area with the plurality of the first projections of the larger diameter cross section. This arrangement effectively equalizes the flow rate distribution of the first fluid over the whole flow path of the first fluid.

According to a second aspect, the invention is also directed to a gas separator for a fuel cell configured to have concavo-convex structures formed in a mutually reversed relation on two opposed sides thereof and to define a flow path for a first fluid on a first side thereof and a flow path for a second fluid on a second side thereof. The gas separator of the second aspect of the invention includes: a center area designed to have therein multiple linear convexes, which are extended in a first direction to introduce the first fluid and the second fluid in the first direction on the respective opposed sides and are arranged to make a flow of the first fluid in one fixed direction on at least the first side; flow distribution areas arranged across the center area to be adjacent to respective ends of the multiple linear convexes and designed to have multiple first projections of a substantially circular cross section that are protruded from the first side to be arranged apart from one another at a preset interval, and multiple second projections that are protruded from the second side to be arranged apart from one another, each of the flow distribution areas being structured to make a flow of the first fluid to be supplied from or discharged to the flow path of the first fluid formed in the center area on the first side; a first port formed in one end section in a direction perpendicular to the first direction of one of the flow distribution areas or one flow distribution area to connect with the one flow distribution area; and a second port formed in an opposed end section in the direction perpendicular to the first direction of the other of the flow distribution areas or the other flow distribution area to connect with the other flow distribution area. In each of the flow distribution areas, plurality of the first projections formed in a region apart from either the first port or the second port are designed to have a larger diameter of the cross section than plurality of the first projections formed in a region close to either the first port or the second port.

In the gas separator for the fuel cell according to the second aspect of the invention, the presence of the plurality of the first projections designed to have the larger diameter of the cross section increases the flow path resistance in both end regions of the flow distribution area in the direction perpendicular to the first direction. The increased flow path resistance in these end regions restricts the flow rate of the first fluid in the end regions of the flow distribution area having the increased flow path resistance, as well as a supply amount or a discharge amount of the first fluid from or to both end sections of the center area in the direction perpendicular to the first direction via the end regions of the flow distribution area having the increased flow path resistance. Such restriction relatively increases the flow rate of the first fluid in a region of the flow distribution area with the plurality of the first projections of the smaller diameter cross section, as well as a supply amount or a discharge amount of the first fluid from or to a central section of the center area in the direction perpendicular to the first direction via the region of the flow distribution area with the plurality of the first projections of the smaller diameter cross section. This arrangement accordingly makes a substantially uniform flow rate distribution of the first fluid over the whole flow path of the first fluid including the center area and the flow distribution areas.

According to a third aspect, the invention is further directed to a gas separator for a fuel cell configured to have concavo-convex structures formed in a mutually reversed relation on two opposed sides thereof and to define a flow path for a first fluid on a first side thereof and a flow path for a second fluid on a second side thereof. The gas separator of the third aspect of the invention includes: a center area designed to have therein multiple linear convexes, which are extended in a first direction to introduce the first fluid and the second fluid in the first direction on the respective opposed sides and are arranged to make a flow of the first fluid in one fixed direction on at least the first side; flow distribution areas arranged across the center area to be adjacent to respective ends of the multiple linear convexes and designed to have multiple first projections of a substantially circular cross section that are protruded from the first side to be arranged apart from one another at a preset interval, and multiple second projections that are protruded from the second side to be arranged apart from one another, each of the flow distribution areas being structured to make a flow of the first fluid to be supplied from or discharged to the flow path of the first fluid formed in the center area on the first side; a first port formed in a central section in a direction perpendicular to the first direction of one of the flow distribution areas or one flow distribution area to connect with the one flow distribution area; and a second port formed in a central section in the direction perpendicular to the first direction of the other of the flow distribution areas or the other flow distribution area to connect with the other flow distribution area. In each of the flow distribution areas, plurality of the first projections formed in a region close to either the first port or the second port are designed to have a larger diameter of the cross section than plurality of the first projections formed in a region apart from either the first port or the second port.

In the gas separator for the fuel cell according to the third aspect of the invention, the presence of the plurality of the first projections designed to have the larger diameter of the cross section increases the flow path resistance in a central region of the flow distribution area in the direction perpendicular to the first direction. The increased flow path resistance in the central region restricts the flow rate of the first fluid in the central region of the flow distribution area having the increased flow path resistance, as well as a supply amount or a discharge amount of the first fluid from or to a central section of the center area in the direction perpendicular to the first direction via the central region of the flow distribution area having the increased flow path resistance. Such restriction relatively increases the flow rate of the first fluid in a region of the flow distribution area with the plurality of the first projections of the smaller diameter cross section, as well as a supply amount or a discharge amount of the first fluid from or to both end sections of the center area in the direction perpendicular to the first direction via the region of the flow distribution area with the plurality of the first projections of the smaller diameter cross section. This arrangement accordingly makes a substantially uniform flow rate distribution of the first fluid over the whole flow path of the first fluid including the center area and the flow distribution areas.

According to a fourth aspect, the invention is also directed to a gas separator for a fuel cell configured to have concavo-convex structures formed in a mutually reversed relation on two opposed sides thereof and to define a flow path for a first fluid on a first side thereof and a flow path for a second fluid on a second side thereof. The gas separator of the fourth aspect of the invention includes: a center area designed to have therein multiple linear convexes, which are extended in a first direction to introduce the first fluid and the second fluid in the first direction on the respective opposed sides and are arranged to make a flow of the first fluid in one fixed direction on at least the first side, the center area being arranged to cause non-uniformity of a flow rate distribution of the first fluid based on a relation to a flow direction of the first fluid on the first side; and flow distribution areas arranged across the center area to be adjacent to respective ends of the multiple linear convexes and designed to have multiple first projections that are protruded from the first side to be arranged apart from one another, and multiple second projections that are protruded from the second side to be arranged apart from one another, each of the flow distribution areas being structured to make a flow of the first fluid to be supplied from or discharged to the flow path of the first fluid formed in the center area on the first side. The first fluid on the first side is made to flow from one end section in a direction perpendicular to the first direction of one of the flow distribution areas or one flow distribution area to an opposed end section in the direction perpendicular to the first direction of the other of the flow distribution areas or the other flow distribution area. In at least one of the flow distribution areas, the flow path of the first fluid defined by plurality of the first projections formed in a region corresponding to a first section of the center area having a relatively high flow rate of the first fluid is designed to have a smaller sectional area in the first direction than the flow path of the first fluid defined by plurality of the first projections formed in a region corresponding to a second section of the center area having a relatively low flow rate of the first fluid.

In the gas separator for the fuel cell according to the fourth aspect of the invention, based on the relation to the flow direction of the first fluid, the first section of the center area having the relatively high flow rate of the first fluid is both end sections of the center area in the direction perpendicular to the first direction. The region of the flow distribution area corresponding to the first section of the center area has the smaller sectional area in the first direction. The smaller sectional area of this region restricts the flow rate of the first fluid supplied from or discharged to the first section of the center area and thereby relatively increases the flow rate of the first fluid supplied from or discharged to the second section of the center area via the region of the flow distribution area having a greater sectional area in the first direction. This arrangement accordingly makes a substantially uniform flow rate distribution of the first fluid over the whole flow path of the first fluid including the center area and the flow distribution areas.

In one preferable application of the gas separator according to the fourth aspect of the invention, in the one flow distribution area, plurality of the first projections formed in a region close to the opposed end section in the direction perpendicular to the first direction are designed to have a smaller flow path sectional area in the first direction than plurality of the first projections formed in another region. In the other flow distribution area, plurality of the first projections formed in a region close to the one end section in the direction perpendicular to the first direction are designed to have a smaller flow path sectional area in the first direction than plurality of the first projections formed in another region.

In the gas separator of this application, according to the relation to the flow direction of the first fluid, the first section of the center area having the relatively high flow rate of the first fluid is both end sections of the center area in the direction perpendicular to the first direction. The gas separator of this application restricts the supply or discharge of the first fluid from or to the first section of the center area with avoiding interference with supply or discharge of the first fluid from or to the second section of the center area. This arrangement efficiently equalizes the flow rate distribution of the first fluid over the whole flow path of the first fluid.

In another preferable application of the gas separator according to the fourth aspect of the invention, the multiple first projections are formed to have a substantially circular cross section and are arranged to be apart from one another at a fixed interval. Plurality of the first projections formed in the region of the flow distribution area corresponding to the first section of the center area are designed to have a larger diameter of the cross section than plurality of the first projections formed in another region. The flow rate distribution of the first fluid is readily equalized by simply increasing the cross sectional diameter of part of the first projections without changing the overall layout of the multiple first projections.

In one preferable application of the gas separator according to the second aspect of the invention, the multiple first projections are arranged at a preset interval in a regular pattern, and the multiple second projections are arranged at a preset interval in a regular pattern. Each of plurality of the first projections formed in the region of the flow distribution area corresponding to the first section of the center area is designed to have a shape of connecting a preset number of plural locations set for formation of the first projections in the regular pattern while avoiding interference with locations set for formation of the second projections. This arrangement effectively equalizes the flow rate distribution of the first fluid without changing the layout of the plurality of the first projections formed in another region other than the region of the flow distribution area corresponding to the first section of the center area and without changing the overall layout of the multiple second projections. This arrangement also limits the influence on the flow of the second fluid.

The technique of the invention is not restricted to the gas separator for the fuel cell having any of the arrangements discussed above but may also be actualized by diversity of other applications, for example, a fuel cell including the gas separator having any of the arrangement discussed above.

BRIEF DESCRIPTION OF THE DRAWINGS

FIG. 5 is a plan view schematically illustrating the structure of a resin frame 13;

FIG. 6 is a plan view schematically illustrating the structure of a resin frame 14;

BEST MODES OF CARRYING OUT THE INVENTION

A. General Structure

Figure 1:
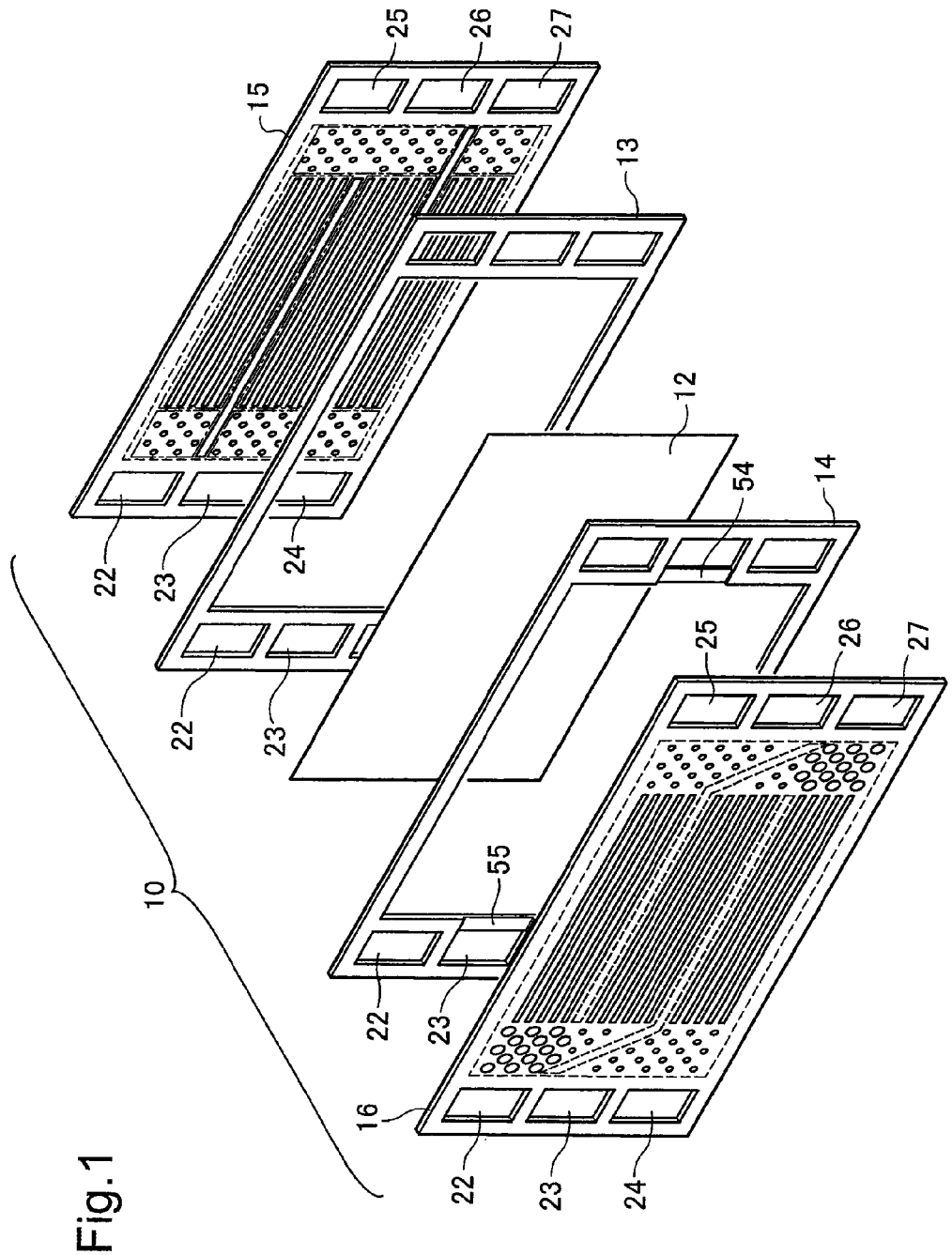
FIG. 1 is an exploded perspective view schematically illustrating the structure of a unit cell in a first embodiment of the invention.
Figure 2:
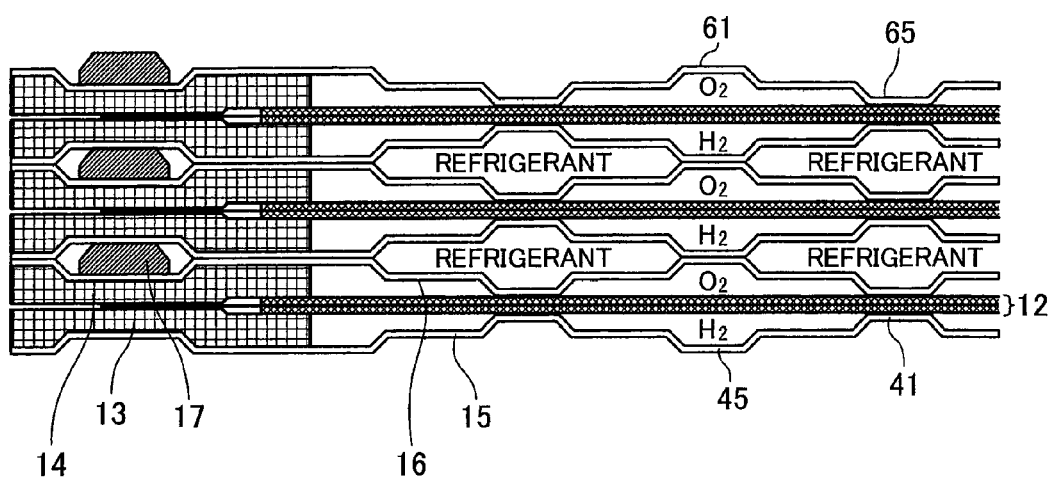
FIG. 2 is a sectional view schematically illustrating the structure of a fuel cell in the first embodiment.

FIG. 1 is an exploded perspective view schematically illustrating the structure of a unit cell in a first embodiment of the invention. FIG. 2 is a sectional view schematically illustrating the structure of a fuel cell in the first embodiment. The fuel cell of the first embodiment has a stack structure of multiple unit cells 10. The exploded perspective view of FIG. 1 shows the structure of one unit cell. The unit cell 10 includes a power generation assembly 12, a pair of resin frames 13 and 14 arranged across the power generation assembly 12 to support the outer circumference of the power generation assembly 12, and a pair of separators 15 and 16 arranged outside the resin frames 13 and 14 that supports the power generation assembly 12.

The power generation assembly 12 includes an electrolyte membrane and a pair of electrodes formed on opposed sides of the electrolyte membrane. The fuel cell of this embodiment is a polymer electrolyte fuel cell. The electrolyte membrane is made of a solid polymer materials, such as a proton-conductive ion exchange membrane of, for example, a fluororesin. An anode and a cathode formed as the pair of electrodes have a catalyst, such as platinum or a platinum alloy and are formed by making the catalyst supported on electrically-conductive carriers. A concrete procedure prepares electrode paste including carbon particles with the catalyst supported thereon and an electrolyte similar to the polymer electrolyte of the electrolyte membrane and applies the electrode paste on the respective sides of the electrolyte membrane to form the anode and the cathode. The power generation assembly 12 of the embodiment also includes gas diffusion layers that are provided on the respective electrodes and are made of a porous material with electrical conductivity, such as carbon paper.

The resin frames 13 and 14 are interposed between the power generation assembly 12 and the separators 15 and 16 to ensure the gas sealing properties in gas flow paths formed between the power generation assembly 12 and the separators 15 and 16.

Each of the separators 15 and 16 and the power generation assembly 12 defines a gas flow path for a reactive gas (a hydrogen-containing fuel gas or an oxygen-containing oxidation gas). The separators 15 and 16 respectively have concavo-convex structures on their surfaces to form the gas flow paths. In the structure of this embodiment, the separators 15 and 16 are substantially rectangular metal thin plate members and are press formed to have the concavo-convex structures with holes provided at predetermined positions. In each of the separators 15 and 16 manufactured by press forming the metal thin plates to have the concavo-convex structures, the concavo-convex structure formed on its surface and the concavo-convex structure formed on its rear side have a mutually reversed relation. The mutually reversed relation represents the status of satisfying a specific relation that the convex shape formed on its surface defines the concave shape on its rear side and that the concave shape formed on its surface defines the convex shape on its rear side. Namely the concavo-convex structure formed on the surface of each of the separators 15 and 16 is reversed to the concave-convex structure on the rear side of each of the separators 15 and 16. The concavo-convex structure of the separator 15 forms an inner-unit cell fuel gas flow path as a passage for the fuel gas between the separator 15 and the power generation assembly 12. In the illustration of FIG. 2, spaces for the inner-unit cell fuel gas flow path are shown by indication of '$H_2$'. Similarly the concavo-convex structure of the separator 16 forms an inner-unit cell oxidation gas flow path as a passage for the oxidation gas between the separator 16 and the power generation assembly 12. In the illustration of FIG. 2, spaces for the inner-unit cell oxidation gas flow path are shown by indication of '$O_2$'. The concavo-convex structure formed on the separator 15 included in one unit cell 10 and the concavo-convex structure formed on the separator 16 included in an adjacent unit cell 10 define an inter-cell refrigerant flow path as a passage for a refrigerant. In the illustration of FIG. 2, spaces for the inter-cell refrigerant flow path are shown by indication of 'refrigerant'.

Figure 3A:
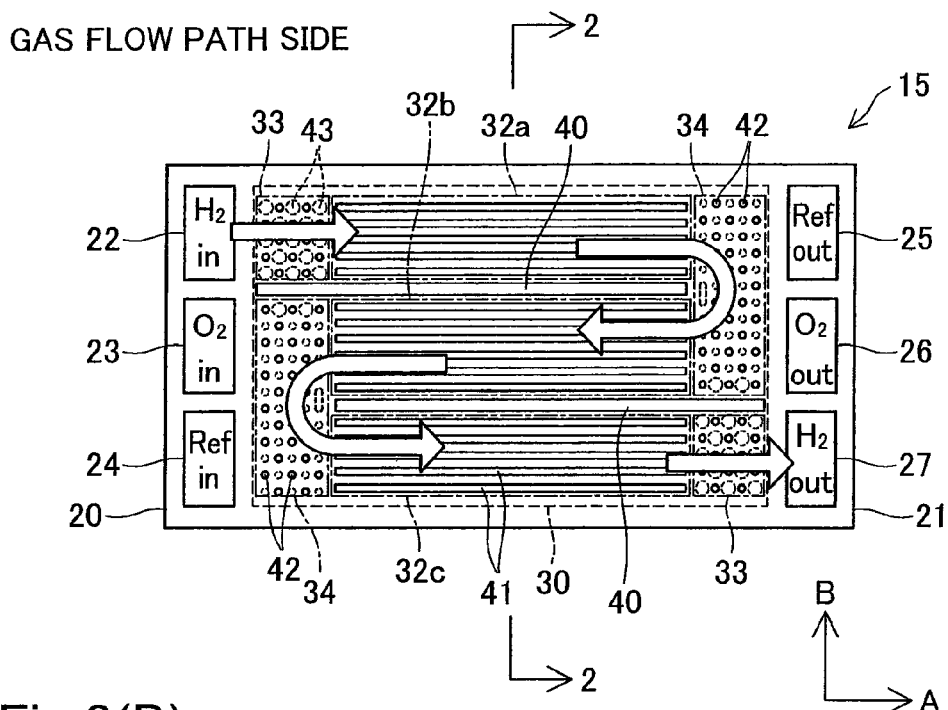
FIGS. 3A and 3B are plan views showing the structure of a separator 15.
Figure 3B:
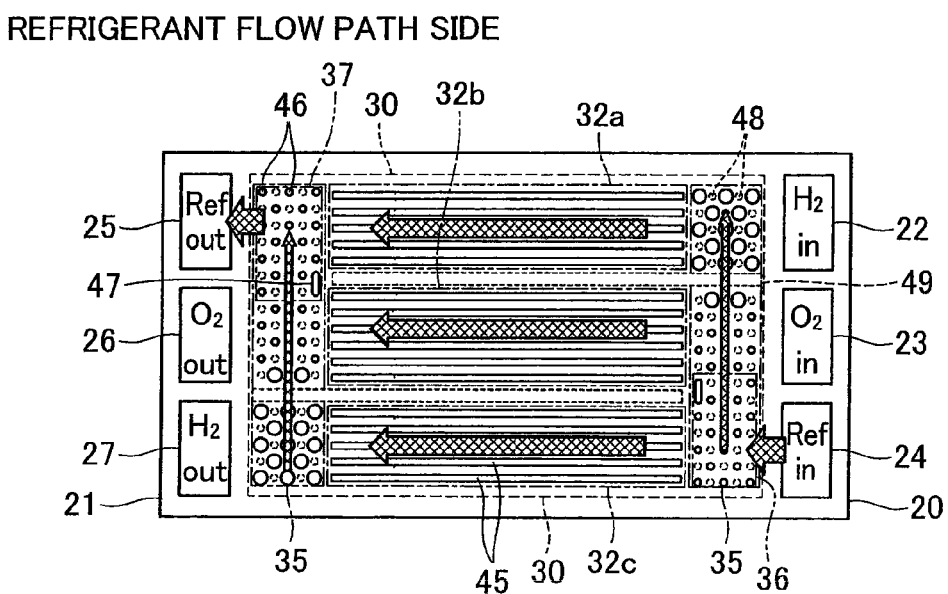

FIG. 3 is plan views showing the structure of the separator 15. FIG. 3(A) shows a gas flow path side of the separator 15 that, in combination with the power generation assembly 12, defines the inner-unit cell fuel gas flow path. FIG. 3(B) shows a refrigerant flow path side of the separator 15 that, in combination with the separator 16 of an adjacent unit cell 10, defines the inter-cell refrigerant flow path. In the illustration of FIG. 3, arrows A and B respectively represent directions corresponding to a horizontal direction and corresponding to a vertical direction in the installation orientation of the fuel cell.

The separator 15 has six holes on its outer circumference thereof. Holes 22, 23, and 24 are formed in this sequence downward in the vertical direction along a vertical side 20 as shown in FIG. 3(A). Holes 25, 26, and 27 are formed in this sequence downward in the vertical direction along a vertical side 21, which is opposed to the side 20 as shown in FIG. 3(A). The separator 16 and the resin frames 13 and 14 similarly have the corresponding holes 22 through 27 formed therein as discussed later. In the assembled fuel cell by laminating the separators 15 and 16 and the resin frames 13 and 14, each set of the corresponding holes are aligned in a laminating direction to form one fluid flow path that passes through the inside of the fuel cell in the laminating direction. A set of the holes 22 are aligned to form a fuel gas supply manifold (expressed as '$H_2$ in' in the illustrations of FIGS. 3 through 6) to make a flow of the fuel gas that is externally supplied to the fuel cell and is distributed into the inner-unit cell fuel gas flow paths. A set of the holes 27 are aligned to form a fuel gas exhaust manifold (expressed as 'H₂ out' in the illustrations of FIGS. 3 through 6) to discharge the fuel gas, which has been subjected to the electrochemical reactions in the respective unit cells, out of the fuel cell. A set of the holes 23 are aligned to form an oxidation gas supply manifold (expressed as 'O₂ in' in the illustrations of FIGS. 3 through 6) to make a flow of the oxidation gas that is externally supplied to the fuel cell and is distributed into the inner-unit cell oxidation gas flow paths. A set of the holes 26 are aligned to form an oxidation gas exhaust manifold (expressed as 'O₂ out' in the illustrations of FIGS. 3 through 6) to discharge the oxidation gas, which has been subjected to the electrochemical reactions in the respective unit cells, out of the fuel cell. A set of the holes 24 are aligned to form a refrigerant supply manifold (expressed as 'Ref in' in the illustrations of FIGS. 3 through 6) to make a flow of the refrigerant that is externally supplied to the fuel cell and is distributed into the inter-cell refrigerant flow paths. A set of the holes 25 are aligned to form a refrigerant discharge manifold (expressed as 'Ref out' in the illustrations of FIGS. 3 through 6) to discharge the refrigerant, which has flowed through the inter-cell refrigerant flow paths, out of the fuel cell.

The gas flow path side of the separator 15 has a first concavo-convex structure that, in combination with the surface of the power generation assembly 12, forms an inner wall side of the inner-unit cell fuel gas flow path. A substantially rectangular area that includes the first concavo-convex structure formed therein and makes the flow of the fuel gas on the surface thereof is hereafter referred to as 'power generation area 30'. The power generation area 30 is an area encircled by a broken line in FIG. 3(A). In this embodiment, the first concavo-convex structure is formed in a substantially rectangular shape and includes two parting linear convexes 40, a large number of inner-parted region linear convexes 41, and a large number of projections 42 as salients.

The two parting linear convexes 40 are extended in a substantially a horizontal direction through the power generation area 30. One parting linear convex 40 has one end that reaches a specific side on the outer circumference of the power generation area 30 close to the side 20 of the separator 15 and the other end that is apart from a specific side on the outer circumference of the power generation area 30 close to the side 21 opposed to the side 20 of the separator 15. The other parting linear convex 40 has one end that reaches the specific side on the outer circumference of the power generation area 30 close to the side 21 of the separator 15 and the other end that is apart from the specific side on the outer circumference of the power generation area 30 close to the side 20 opposed to the side 21 of the separator 15.

The inner-parted region linear convexes 41 are extended in the substantially horizontal direction and are formed to have both ends apart from the outer circumference of the power generation area 30. A preset number (five in the illustrated embodiment) of multiple inner-parted region linear convexes 41 are collectively located between the two parting linear convexes 40 and between the respective parting linear convexes 40 and the outer circumference of the power generation area 30. The inner-parted region linear convexes 41 are formed to have a shorter width than the width of the parting linear convexes 40. Each of sectional areas segmented by the parting linear convexes 40 to include the preset number of multiple inner-parted region linear convexes 41 is hereafter referred to as 'parted region 32'. In the structure of this embodiment, the two parting linear convexes 40 form three parted regions 32. The respective parted regions 32 are encircled by one-dot chain lines in FIG. 3(A). In the description below, a parted region 32a, a parted region 32c, and a parted region 32b respectively represent a segmented area located on a top end side of the separator 15, a segmented area located on a bottom end side of the separator 15, and a segmented area provided between the parted region 32a and the parted region 32c.

The projections 42 are formed outside the parted regions 32 and are arranged at preset intervals in each gas flow area that makes an incoming flow of a gas into the parted region 32 or an outgoing flow of the gas from the parted region 32. In the illustrated embodiment, inflow outflow areas 33 and connection areas 34 are the gas flow areas with the projections 42. The inflow outflow areas 33 are provided in the vicinity of the hole 22 and in the vicinity of the hole 27. Each of the inflow outflow areas 33 is defined by one end of the parted region 32, part of the outer circumference of the power generation area 30, and part of the parting linear convex 40. Each of the connection areas 34 includes a separate region provided between the other end of the parting linear convex 40 and part of the outer circumference of the power generation area 30 and is defined by respective ends of two adjacent parted regions 32, part of the outer circumference of the power generation area 30, and part of the parting linear convex 40. The inflow outflow areas 33 and the connection areas 34 are encircled by one-dot chain lines in FIG. 3(A). In the illustrated embodiment, the projections 42 are formed as salients of circular cross sections. The inflow outflow areas 33 and the connection areas 34 also have a large number of recesses 43 of circular cross sections arranged at preset intervals to be located between the large number of projections 42 arranged at the preset intervals. The projections 42 and the recesses 43 are alternately arranged at preset intervals both in a parallel direction and in a perpendicular direction to the parting linear convexes 40. The projections 42 are formed to have substantially identical dimensions, while the recesses 43 are formed to have different dimensions by location. The different sizes of the recesses 43 and the different sizes of projections as the reverse shape of the recesses 43 will be described later.

The separator 15 of the embodiment has one parting linear convex 40 with its one end reaching the specific side on the outer circumference of the power generation area 30 close to the side 20 and one parting linear convex 40 with its one end reaching the specific side on the outer circumference of the power generation area 30 close to the side 21. The connection areas 34 are provided in the vicinity of the respective other ends of the two parting linear convexes 40. In the separator 15 of the embodiment, the three parted regions 32 are thus connected in series via the connection areas 34.

The refrigerant flow path side of the separator 15 has a second concavo-convex structure that, in combination with the opposed surface of the separator 16, forms an inner wall side of the inter-cell refrigerant flow path in a rear side area on the reverse of the power generation area 30 (in the description hereafter, the rear side area is also regarded as the power generation area 30). In this embodiment, the second concavo-convex structure includes a large number of refrigerant flow linear convexes 45, a large number of projections 46, and flow distribution convexes 47 as salients (see FIG. 3(B)).

The refrigerant flow linear convexes 45 are extended in the substantially horizontal direction to have both ends apart from the outer circumference of the power generation area 30. The refrigerant flow linear convexes 45 are provided as the reverse shape of grooves formed between the adjacent inner-parted region linear convexes 41 and between the inner-parted region linear convex 41 and the parting linear convex 40 on the gas flow path side of the separator 15. The refrigerant flow linear convexes 45 are formed over rear side areas on the reverse of the parted regions 32a through 32c (in the description hereafter, the rear side areas are also regarded as the parted regions 32a through 32c) in a center portion of the separator 15. The projections 46 are provided as the reverse shape of the recesses 43 formed on the gas flow path side of the separator 15 in specific areas that are adjacent to the respective ends of the refrigerant flow linear convexes 45 and correspond to the inflow outflow areas 33 and the connection areas 34 formed on the gas flow path side of the separator 15 (in the description hereafter, the specific areas are referred to as flow distribution areas 35). The refrigerant flow path side of the separator 15 has recesses 48 provided as the reverse shape of the projections 42 formed on the gas flow path side.

As mentioned previously, the projections 46 are formed to have different dimensions or more specifically different diameters of the circular cross sections by location. The projections 46 are designed to have a smaller diameter in the vicinity of the hole 24 for defining the refrigerant supply manifold and in the vicinity of the hole 25 for defining the refrigerant discharge manifold and to have a greater diameter in the vicinities of the holes 22 and 27 distant away from the holes 24 and 25. The different dimensions of the projections 46 vary the size of the flow path sectional area for the refrigerant flow or the flow path resistance with location. The relation between the dimensions of the projections 46 and the refrigerant flow will be discussed later.

The flow distribution convexes 47 are provided in the vicinity of the respective other ends of the parting linear convexes 40 apart from the outer circumference of the power generation area 30. The flow distribution convexes 47 are designed to regulate the flow rate of the refrigerant flowing through the grooves provided as the reverse shape of the parting linear convexes 40.

Figure 4A:
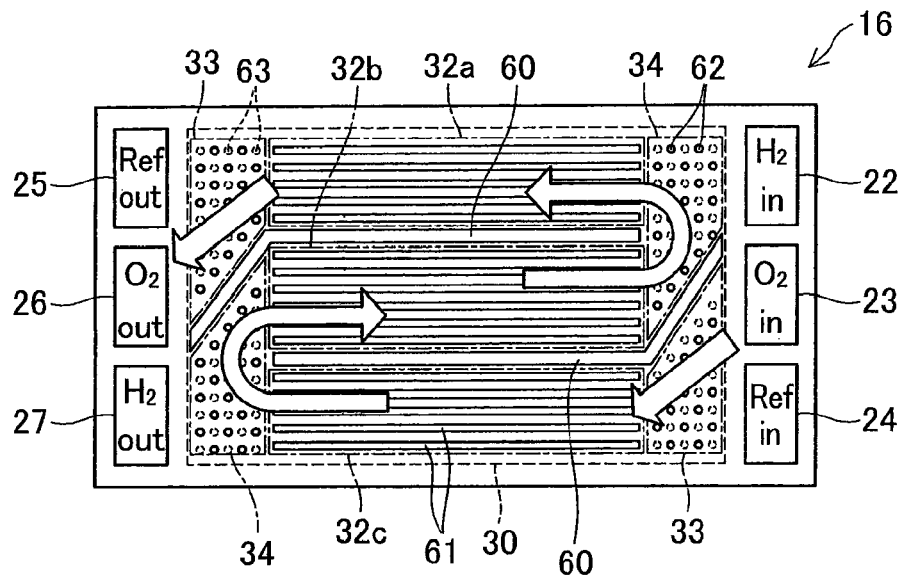
FIGS. 4A and 4B are plan views showing the structure of a separator 16.
Figure 4B:
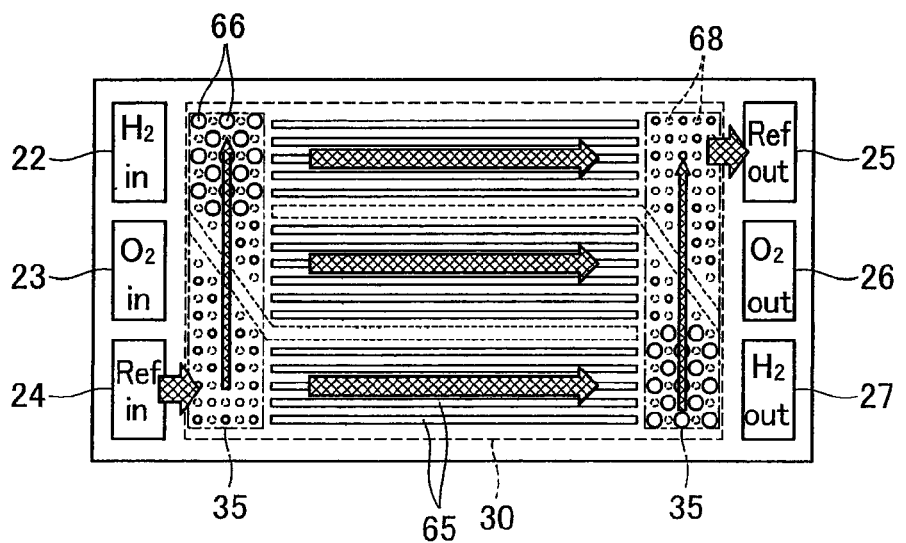

FIG. 4 is plan views showing the structure of the separator 16. FIG. 4(A) shows a gas flow path side of the separator 16 that, in combination with the power generation assembly 12, defines the inner-unit cell oxidation gas flow path. FIG. 4(B) shows a refrigerant flow path side of the separator 16 that, in combination with the separator 15 of an adjacent unit cell 10, defines the inter-cell refrigerant flow path. The separator 16 is a metal thin plate member having substantially the same outer circumferential shape as that of the separator 15 and is press formed to have the concavo-convex structures with holes provided at predetermined positions.

The gas flow path side of the separator 16 has a first concavo-convex structure that, in combination with the surface of the power generation assembly 12, forms an inner wall side of the inner-unit cell oxidation gas flow path. A substantially rectangular area that includes the first concavo-convex structure formed therein and makes the flow of the fuel gas on the surface thereof is hereafter referred to as 'power generation area 30'. The power generation area 30 is an area encircled by a broken line in FIG. 4(A). In this embodiment, the first concavo-convex structure includes two parting linear convexes 60, a large number of inner-parted region linear convexes 61, and a large number of projections 62 as salients.

Like the inner-parted region linear convexes 41 formed on the gas flow path side of the separator 15, the inner-parted region linear convexes 61 are extended in the substantially horizontal direction and are formed to have both ends apart from the outer circumference of the power generation area 30. A preset number (five in the illustrated embodiment) of multiple inner-parted region linear convexes 61 are collectively located between the two parting linear convexes 60 and between the respective parting linear convexes 60 and the outer circumference of the power generation area 30 to define each parted region 32. Like the parting linear convexes 40 formed on the gas flow path side of the separator 15, each of the parting linear convexes 60 is designed to have one end that reaches the outer circumference of the power generation area 30 and the other end that is apart from the outer circumference of the power generation area 30. The parting linear convexes 60 are provided between the adjacent parted regions 32. Each of the parting linear convexes 60 includes a horizontal section that has a length equivalent to that of the inner-parted region linear convexes 61 and is extended in the substantially horizontal direction through the power generation area 30, and an inclined section that is inclined to the horizontal direction and reaches the outer circumference of the power generation area 30. In the structure of this embodiment, the two parting linear convexes 60 form three parted regions 32 (32a through 32c).

The projections 62 are formed outside the parted regions 32 and are arranged at preset intervals in each gas flow area that makes an incoming flow of a gas into the parted region 32 or an outgoing flow of the gas from the parted region 32. The gas flow areas include inflow outflow areas 33 and connection areas 34. The inflow outflow areas 33 are provided in the vicinity of the holes 25 and 26 and in the vicinity of the holes 23 and 24. Each of the inflow outflow areas 33 is defined by one end of the parted region 32, part of the outer circumference of the power generation area 30, and the inclined section of the parting linear convex 60. Each of the connection areas 34 includes a separate region provided between the other end of the parting linear convex 40 and part of the outer circumference of the power generation area 30 and is defined by respective ends of two adjacent parted regions 32, part of the outer circumference of the power generation area 30, and the inclined section of the parting linear convex 40. The inflow outflow areas 33 and the connection areas 34 are encircled by one-dot chain lines in FIG. 4(A). Like the projections 42, the projections 62 are formed as salients of circular cross sections. The inflow outflow areas 33 and the connection areas 34 also have a large number of recesses 63 of circular cross sections arranged at preset intervals to be located between the large number of projections 62 arranged at the preset intervals. Like the recesses 43, the recesses 63 are formed to have different dimensions by location. In the separator 16 of the embodiment, the two parting linear convexes 60 interconnect the three parted regions 32 in series via the two connection areas 34.

The refrigerant flow path side of the separator 16 has a second concavo-convex structure that, in combination with the opposed surface of the separator 15, forms an inner wall side of the inter-cell refrigerant flow path in the power generation area 30. In this embodiment, the second concavo-convex structure includes a large number of refrigerant flow linear convexes 65 and a large number of projections 66 as salients.

Like the refrigerant flow linear convexes 45 formed on the separator 15, the refrigerant flow linear convexes 65 are extended in the substantially horizontal direction to have both ends apart from the outer circumference of the power generation area 30. The refrigerant flow linear convexes 65 are provided as the reverse shape of grooves formed between the adjacent inner-parted region linear convexes 61 and between the inner-parted region linear convex 61 and the parting linear convex 60 on the gas flow path side of the separator 16 over the parted regions 32a through 32c. The projections 66 are provided as the reverse shape of the recesses 63 formed on the gas flow path side of the separator 16 in the flow distribution areas 35. The refrigerant flow path side of the separator 16 has recesses 68 provided as the reverse shape of the projections 62 formed on the gas flow path side. Like the projections 46, the projections 66 are designed to have a smaller diameter in the vicinity of the holes 24 and 25 and to have a greater diameter in the vicinities of the holes 22 and 27 distant away from the holes 24 and 25.

FIG. 5 is a plan view schematically illustrating the structure of the resin frame 13. One side of the resin frame 13 in contact with the gas flow path side of the separator 15 is shown in FIG. 5. The resin frame 13 has a center hole 50 formed in a central region thereof. The center hole 50 is formed in a substantially rectangular shape to be slightly smaller than the size of the power generation assembly 12. The resin frame 13 also has a recess 51 formed to connect the hole 22 with the center hole 50 and a recess 52 formed to connect the hole 27 with the center hole 50. The recess 51 and the opposed surface of the separator 15 define a flow path for connecting the fuel gas supply manifold defined by the set of the holes 22 with the inner-unit cell fuel gas flow path. The recess 52 and the opposed surface of the separator 15 define a flow path for connecting the fuel gas exhaust manifold defined by the set of the holes 27 with the inner-unit cell fuel gas flow path.

FIG. 6 is a plan view schematically illustrating the structure of the resin frame 14. One side of the resin frame 14 in contact with the gas flow path side of the separator 16 is shown in FIG. 6. The resin frame 14 has a center hole 53 formed in a central region thereof to have the same shape as and to be aligned with the center hole 50 of the resin frame 13. The resin frame 14 also has a recess 54 formed to connect the hole 26 with the center hole 53 and a recess 55 formed to connect the hole 23 with the center hole 53. The recess 54 and the opposed surface of the separator 16 define a flow path for connecting the oxidation gas supply manifold defined by the set of the holes 26 with the inner-unit cell oxidation gas flow path. The recess 55 and the opposed surface of the separator 16 define a flow path for connecting the oxidation gas exhaust manifold defined by the set of the holes 23 with the inner-unit cell oxidation gas flow path.

The resin frames 13 and 14 are made of an insulating resin material and are arranged to support the power generation assembly 12 interposed therebetween. This arrangement ensures the insulation property between the two opposed sides of the power generation assembly 12. The resin frames 13 and 14 are located between the power generation assembly 12 and the separators 15 and 16 having the concavo-convex structures of predetermined heights and function as spacers for maintaining distances corresponding to the concavo-convex structures of the predetermined heights between the power generation assembly 12 and the separators 15 and 16.

A procedure of assembling the fuel cell bonds the separator 15 to the resin frame 13 via a sealing member (not shown) made of, for example, an adhesive and similarly bonds the separator 16 to the resin frame 14 via a sealing member (not shown) made of, for example, an adhesive. The procedure subsequently locates the power generation assembly 12 between the resin frames 13 and 14 and bonds the power generation assembly 12 to the resin frames 13 and 14 via sealing members (not shown) made of, for example, an adhesive. This completes a unit cell of the fuel cell. The power generation assembly 12 is bonded to the resin frames 13 and 14, such that the center hole 50 of the resin frame 13 and the center hole 53 of the resin frame 14 are covered over with the power generation assembly 12. Stacking a preset number of the unit cells thus obtained via sealing members 17 (see FIG. 2) made of, for example, an adhesive completes the fuel cell. The presence of the sealing members between the respective adjacent members ensures the sealing properties in the inner-unit cell gas flow paths and in the manifolds.

In assembly of the fuel cell by stacking the respective members, the parting linear convexes 40 on the separator 15 are arranged to be opposed to the horizontal sections of the parting linear convexes 60 on the separator 16 across the power generation assembly 12. Similarly the inner-parted region linear convexes 41 on the separator 15 are opposed to the inner-parted region linear convexes 61 on the separator 16. The projections 42 on the separator 15 are opposed to the projections 62 on the separator 16. The tops of the projections 46 on the separator 15 are in contact with the tops of the projections 66 on the adjacent separator 16. Such mutual support of the corresponding salients in the laminating direction ensures the rigidity of the fuel cell as the whole stack structure. The cross section of FIG. 2 is cut in a direction perpendicular to the longitudinal direction of the respective linear convexes and is taken on a line 2-2 in FIG. 3(A). The sectional view of FIG. 2 specifically shows the cross section in the proximity of the outer circumference of the fuel cell including the resin frames 13 and 14.

In the assembled fuel cell, the fuel gas supplied to the fuel gas supply manifold formed by the set of holes 22 is distributed into the inner-unit cell fuel gas flow paths formed in the respective unit cells. The fuel gas in each inner-unit cell fuel gas flow path goes downward in the vertical direction as a whole, while running in the horizontal direction in the respective parted regions 32 as shown by open arrows in FIG. 3(A). The fuel gas flowed through the respective inner-unit cell fuel gas flow paths and subjected to the electrochemical reaction is discharged through the fuel gas exhaust manifold formed by the set of holes 27.

The oxidation gas supplied to the oxidation gas supply manifold formed by the set of holes 23 is distributed into the inner-unit cell oxidation gas flow paths formed in the respective unit cells. The oxidation gas in each inner-unit cell oxidation gas flow path goes upward in the vertical direction as a whole, while running in the horizontal direction in the respective parted regions 32 as shown by open arrows in FIG. 4(A). The oxidation gas flowed through the respective inner-unit cell oxidation gas flow paths and subjected to the electrochemical reaction is discharged through the oxidation gas exhaust manifold formed by the set of holes 26.

The refrigerant supplied to the refrigerant supply manifold formed by the set of holes 24 is distributed into the inter-cell refrigerant flow paths formed between the separator 15 of one unit cell and the separator 16 of an adjacent unit cell. The refrigerant in each inter-cell refrigerant flow path runs from the hole 24 to the hole 25 as shown by hatched arrows in FIGS. 3(B) and 4(B). The refrigerant flowed in through the refrigerant supply manifold is diffused in the flow distribution areas 35 that are the areas with the projections 46 and the areas with the projections 66. The diffused refrigerant is introduced by the refrigerant flow linear convexes 45 and 65 to move straight in the flow paths defined by the refrigerant flow linear convexes 45 and 65. The straight refrigerant flows are collected in the flow distribution areas 35 close to the hole 25. The collected refrigerant flow is discharged through the refrigerant discharge manifold formed by the set of holes 25.

In the structures of the separators 15 and 16 of the embodiment, the areas with the multiple projections 42, the areas with the multiple projections 46, the areas with the multiple projections 62, and the areas with the multiple projections 66 (the inflow outflow areas 33, the connection areas 34, and the flow distribution areas 35) are provided in the vicinities of the holes 22 through 27 for defining the respective manifolds. This arrangement allows the mutually reverse shapes on the two opposed sides to achieve the serpentine gas flow path simultaneously with the straight refrigerant flow path. The presence of the multiple projections apart from one another at preset intervals on the two opposed sides introduces the flow of the refrigerant in one direction on one side, while making the reverse flow of the gas on the other side.

In the fuel cell of the embodiment constructed as discussed above, varying the sizes of the projections 46 and 66 provided on the refrigerant flow path sides of the respective separators 15 and 16 by location makes the substantially uniform flow rate distribution of the refrigerant flowing through the inter-cell refrigerant flow paths. The substantially uniform flow rate distribution of the refrigerant desirably improves the cooling efficiency of the refrigerant flow for the fuel cell. This also restricts a local temperature increase or a local temperature decrease in the plane as the location of power generation, thus homogenizing the progress of the electrochemical reactions in the plane and stabilizing the power generation status.

In the fuel cell of the embodiment, the overall uniformity of the size and the layout of the projections 46 or 66 causes the flow rate of the refrigerant in the parted regions 32a and 32c to be higher than the flow rate of the refrigerant in the parted region 32b. In the structure of the embodiment, the refrigerant flow is made straight in the center area of the power generation area 30 (including the parted regions 32a through 32c). The flow distribution areas 35 are provided on both ends of the center area to distribute the flow of the refrigerant. The refrigerant supply manifold and the refrigerant discharge manifold are arranged diagonally outside the power generation area 30, that is, at a lower end corner and an upper end corner in the vertical direction on the opposed sides of the separator. The overall uniformity of the size and the interval of the projections 46 or 66 encourages the refrigerant flow to move straight from the hole 24 to the parted region 32c or to move straight upward in the vertical direction in the flow distribution areas 35. The refrigerant flow going straight upward in the vertical direction in the flow distribution areas 35 comes into contact with the resin frames 13 and 14 on the outer circumference of the power generation area 30 and is mostly flowed into the parted region 32a. This makes the high flow rate of the refrigerant in the parted regions 32a and 32c, while making the relatively low flow rate of the refrigerant in the parted region 32b. Namely the parted regions 32a and 32c are the areas with the relatively high flow rate of the refrigerant according to the positional relation to the manifolds (high refrigerant flow rate areas).

The projections 46 or 66 are formed to have the cross sections of the larger diameter in specific sections of the flow distribution areas 35 arranged to supply and discharge the refrigerant from and to the high refrigerant flow rate areas or specific sections of the flow distribution areas 35 corresponding to the high refrigerant flow rate areas (specific sections of the flow distribution areas 35 having the same relative positions in the vertical direction as those of the high refrigerant flow rate areas). The specific sections with the larger diameter projections 46 or 66 have the smaller flow path sectional area and thereby the higher flow path resistance of the refrigerant flow.

In the flow distribution area 35 on the side of the hole 24 (upstream flow distribution area), the larger diameter projections 46 or 66 are formed in an upper region apart from the hole 24 in the vertical direction. The upper region in the vertical direction of the upstream flow distribution area 35 accordingly has the higher flow path resistance. This arrangement lowers the flow rate of the upward refrigerant flow in the upstream flow distribution area 35 and inhibits the inflow of the refrigerant to the parted region 32a. In the flow distribution area 35 on the side of the hole 25 (downstream flow distribution area), the larger diameter projections 46 or 66 are formed in a lower region apart from the hole 25 in the vertical direction. The lower region in the vertical direction of the downstream flow distribution area 35 accordingly has the higher flow path resistance. This arrangement restricts the upward flow of the refrigerant in the vertical direction from a vertically lower end section of the downstream flow distribution area 35. The restricted flow of the refrigerant discharged from the parted region 32c to the downstream flow distribution area 35 inhibits the inflow of the refrigerant to the parted region 32c. The presence of the larger diameter projections 46 or 66 in the vertically lower end section of the downstream flow distribution area 35 restricts the upward gas flow in the vertical direction and increases the flow path resistance of the refrigerant discharged from the parted region 32c to the downstream flow distribution area 35 to further inhibit the inflow of the refrigerant to the parted region 32c. This increases the inflow amount of the refrigerant to the parted region 32b in the center area of the power generation area 30, thus making the substantially equal amounts of the refrigerant flowed into the respective parted regions 32a through 32c and equalizing the flow rate distribution of the refrigerant flowing over the flow distribution areas 35. The flow rate of the refrigerant can thus be equalized over the whole power generation area 30 including the three parted regions 32a through 32c and the two flow distribution areas 35.

In the structure of the embodiment, the projections 42, 46, 62, or 66 are arranged at preset intervals. More specifically, the projections 42, 46, 62, or 66 are arranged to have a fixed distance between the centers of the circular cross sections of any adjacent projections in both the vertical direction and the horizontal direction. Among the multiple projections arranged at the preset intervals, only the projections in a partial area on the refrigerant flow path side are made to have the larger diameter. This arrangement does not require a change of the overall layout pattern of the projections, thereby limiting the effect on the gas flow in the gas flow path.

In the structure of the embodiment, the presence of the flow distribution convexes 47 provided in the vicinity of the ends of the grooves as the reverse shape of the parting linear convexes 40 aims to make the further uniform in-plane distribution of the refrigerant flow. As explained previously, the parting linear convexes 40 are designed to have the greater width than that of the inner-parted region linear convexes 41. The linear grooves as the reverse shape of the parting linear convexes 40 accordingly have the higher flow rate of the refrigerant than the parted regions 32a through 32c with the inner-parted region linear convexes 41 on the refrigerant flow path side. This leads to a non-uniform in-plane distribution of the refrigerant flow rate. The presence of the flow distribution convexes 47 in the vicinity of the ends of the parting linear convexes 40 in the structure of the embodiment effectively prevents the inflow of the refrigerant and the outflow of the refrigerant to and from the linear grooves as the reverse shape of the parting linear convexes 40. The restricted flow rate of the refrigerant in the linear grooves substantially equalizes the overall flow rate distribution. The flow rate of the refrigerant flowing through the linear grooves is controllable by adjusting the distance between an end of the linear groove and the flow distribution convex 47. The presence of the flow distribution convexes 47 makes a substantially uniform refrigerant flow. In the event of inhomogeneous in-plane heat distribution, the adjustment of the distance between the end of the linear groove and the flow distribution convex 47 controls the flow rate of the refrigerant and makes the in-plane distribution of the refrigerant flow rate approach to a desired distribution. In the structure of this embodiment, the flow distribution convexes 47 are provided only on the separator 15. Similar flow distribution convexes may be provided on the refrigerant flow path side of the separator 16, in addition to or in place of the refrigerant flow path side of the separator 15.

B. Second Embodiment

In the structure of the first embodiment, the refrigerant supply manifold and the refrigerant discharge manifold are arranged diagonally outside the substantially rectangular power generation area on the side of the separator. This arrangement is, however, neither essential nor restrictive. A fuel cell of another structure with a different layout of manifolds is discussed below as a second embodiment of the invention. The fuel cell of the second embodiment has the similar structure to that of the fuel cell of the first embodiment, except that the separators 15 and 16 are replaced with separators 115 and 116 and that recesses 54 and 55 (not shown) are provided in the vicinities of the holes 24 and 25 on the resin frame 14. The like elements are expressed by the like reference numbers and are not specifically explained here.

Figure 7A:
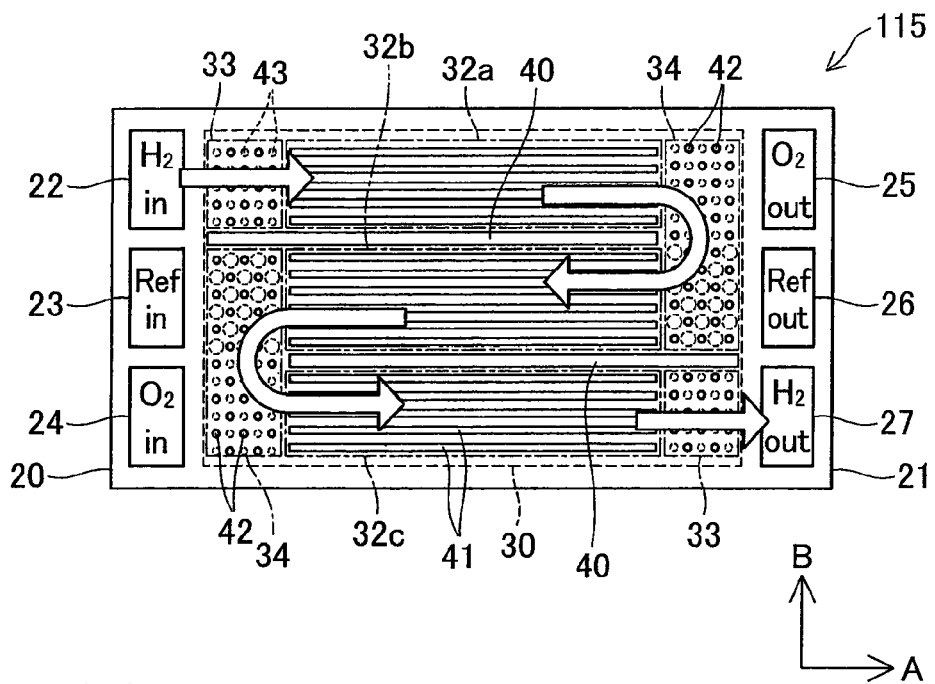
FIGS. 7A and 7B are plan views showing the structure of a separator 115.
Figure 7B:
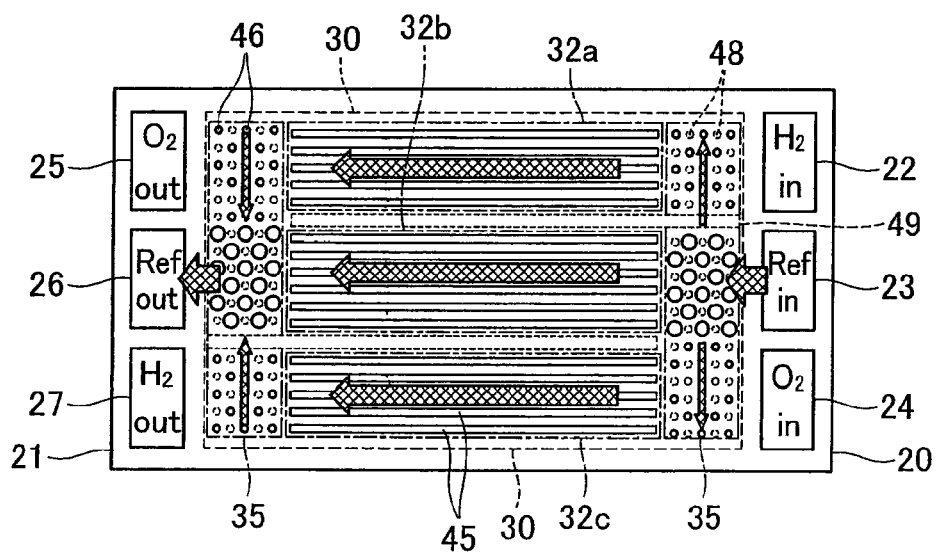
Figure 8A:
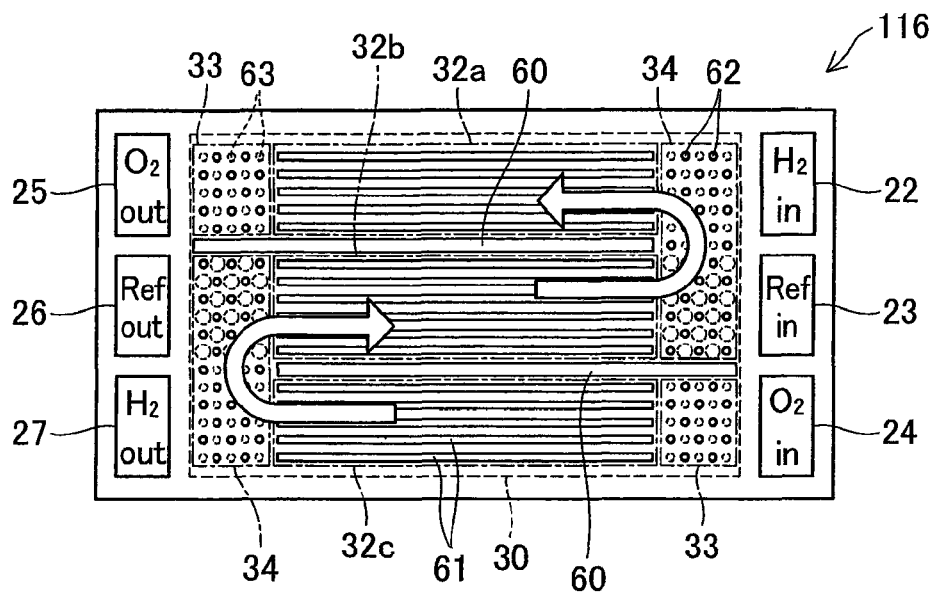
FIGS. 8A and 8B are plan views showing the structure of a separator 116.
Figure 8B:
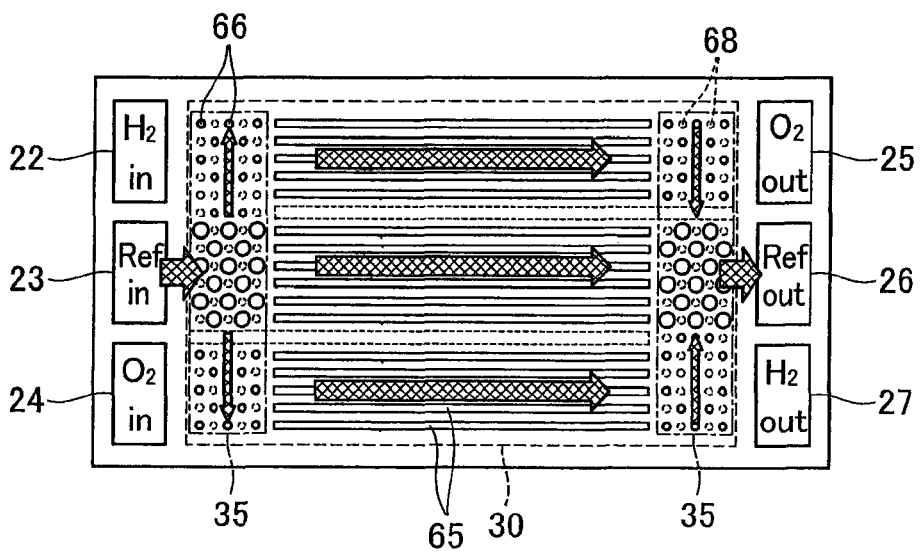

FIG. 7 is plan views showing the structure of the separator 115 included in the fuel cell of the second embodiment. FIG. 8 is plan views showing the structure of the separator 116 included in the fuel cell of the second embodiment. FIGS. 7(A) and 8(A) show gas flow path sides, and FIGS. 7(B) and 8(B) show refrigerant flow path sides. In the structure of the second embodiment, a set of holes 23 formed in the middle of the side 20 on the respective separators define a refrigerant supply manifold. A set of holes 26 formed in the middle of the side 21 on the respective separators define a refrigerant discharge manifold. A set of holes 24 formed at the lower end in the vertical direction of the side 20 on the respective separators define an oxidation gas supply manifold. A set of holes 25 formed at the upper end in the vertical direction of the side 21 on the respective separators define an oxidation gas exhaust manifold. On the refrigerant flow path sides of the separators 115 and 116 in the second embodiment, multiple projections 46 or 66 having the larger diameter cross sections are formed in middle regions of the flow distribution areas 35 in the vertical direction in the vicinities of the holes 23 and 25 for defining the refrigerant supply and discharge manifolds.

In the structure of the second embodiment, the set of holes 23 and the set of holes 26 define the refrigerant supply and discharge manifolds to supply and discharge the refrigerant at the middle locations in the vertical direction from and to the flow distribution areas 35. The overall uniformity of the size and the layout of the projections 46 or 66 causes the flow rate of the refrigerant in the parted region 32b to be higher than the flow rates of the refrigerant in the parted regions 32a and 32c. The main part of the refrigerant flow from the hole 23 to the upstream flow distribution area 35 runs straight into the parted region 32b and flows into the hole 26 via the downstream flow distribution area 35. Namely the parted region 32b is the area with the relatively high flow rate of the refrigerant according to the positional relation to the manifolds (high refrigerant flow rate area).

The projections 46 or 66 are formed to have the cross sections of the larger diameter in specific sections of the flow distribution areas 35 arranged to supply and discharge the refrigerant from and to the high refrigerant flow rate area or specific sections of the flow distribution areas 35 corresponding to the high refrigerant flow rate area (specific sections of the flow distribution areas 35 having the same relative position in the vertical direction as that of the high refrigerant flow rate area). The specific sections with the larger diameter projections 46 or 66 have the smaller flow path sectional area and thereby the higher flow path resistance of the refrigerant flow.

In the flow distribution area 35 on the side of the hole 23 (upstream flow distribution area), the larger diameter projections 46 or 66 are formed in a middle region between the hole 23 and the parted region 32b to have the higher flow path resistance. This arrangement inhibits the inflow of the refrigerant from the hole 23 to the parted region 32b and increases the flow rates of the vertically upward refrigerant flow and the vertically downward refrigerant flow in the upstream flow distribution area 35. In the flow distribution area 35 on the side of the hole 26 (downstream flow distribution area), the larger diameter projections 46 or 66 are formed in a middle region between the hole 26 and the parted region 32b to have the higher flow path resistance. This arrangement relatively lowers the flow path resistance of the vertically downward refrigerant flow from a vertically upper end section of the downstream flow distribution area 35 and the flow path resistance of the vertically upward refrigerant flow from a vertically lower end section of the downstream flow distribution area 35. The lowered flow path resistances in the downstream flow distribution area 35 accelerate the inflow of the refrigerant to the parted regions 32a and 32b. The increased flow path resistance of the refrigerant discharged from the parted region 32b to the downstream flow distribution area 35 inhibits the inflow of the refrigerant to the parted region 32b. This makes the substantially equal amounts of the refrigerant flowed into the respective parted regions 32a through 32c and substantially equalizes the flow rate of the refrigerant over the whole power generation area 30 including the three parted regions 32a through 32c and the two flow distribution areas 35.

In the structure of the second embodiment, the larger diameter projections 46 or 66 are provided both in the middle region close to the hole 23 in the upstream flow distribution area 35 and in the middle region close to the hole 26 in the downstream flow distribution area 35. In one modified structure, the larger diameter projections 46 or 66 may be provided only in either the middle region close to the hole 23 in the upstream flow distribution area 35 or the middle region close to the hole 26 in the downstream flow distribution area 35. This modified arrangement ensures the similar effect of substantially equalizing the flow rate distribution of the refrigerant.

C. Third Embodiment

In the structure of the first embodiment, the projections 46 or 66 are formed to have the cross sections of the varying diameter in the flow distribution areas 35. Another structure may be adopted to vary the refrigerant flow resistance in the vertical direction by location. A fuel cell of another structure adopted to vary the refrigerant flow resistance in the vertical direction by location in the flow distribution areas 35 is discussed below as a third embodiment of the invention. The fuel cell of the third embodiment has the similar structure to that of the fuel cell of the first embodiment, except that the separators 15 and 16 are replaced with separators 215 and 216. The like elements are expressed by the like reference numbers and are not specifically explained here.

Figure 9A:
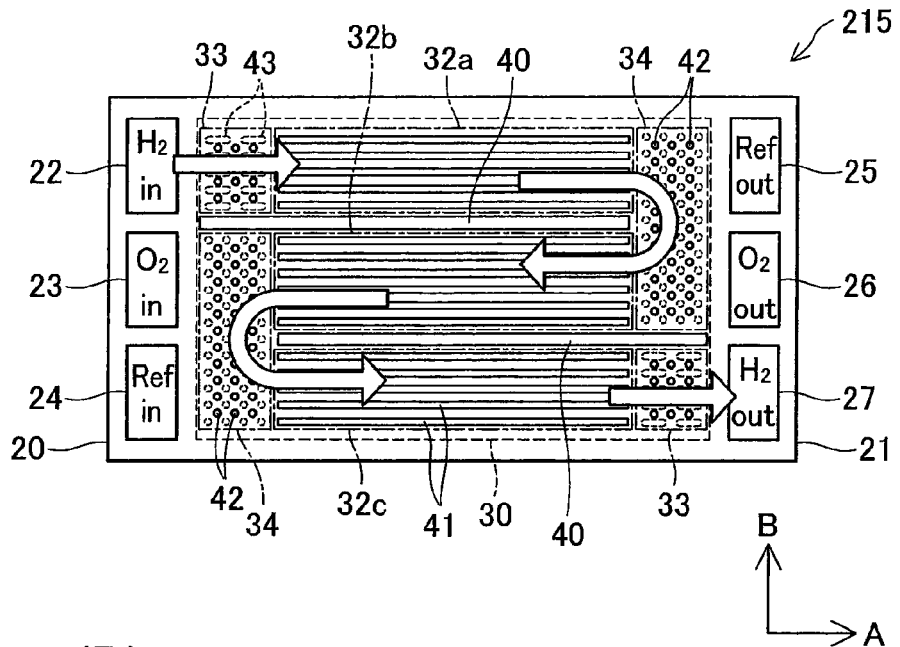
FIGS. 9A and 9B are plan views showing the structure of a separator 215.
Figure 9B:
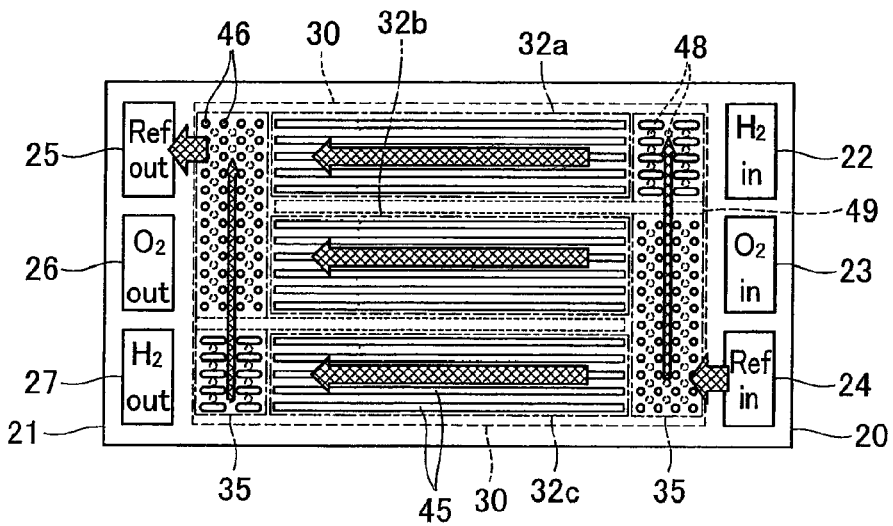
Figure 10A:
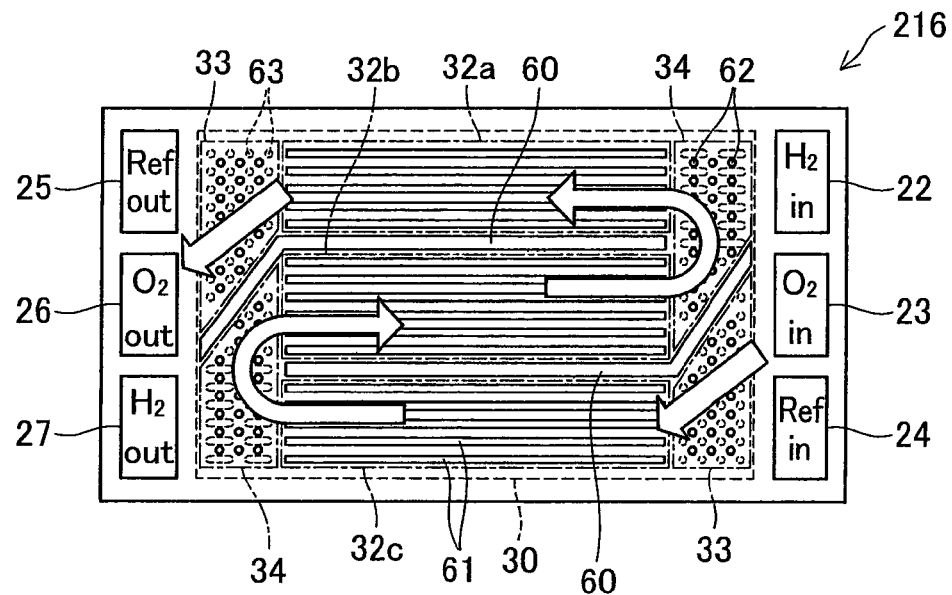
FIGS. 10A and 10B are plan views showing the structure of a separator 216.
Figure 10B:
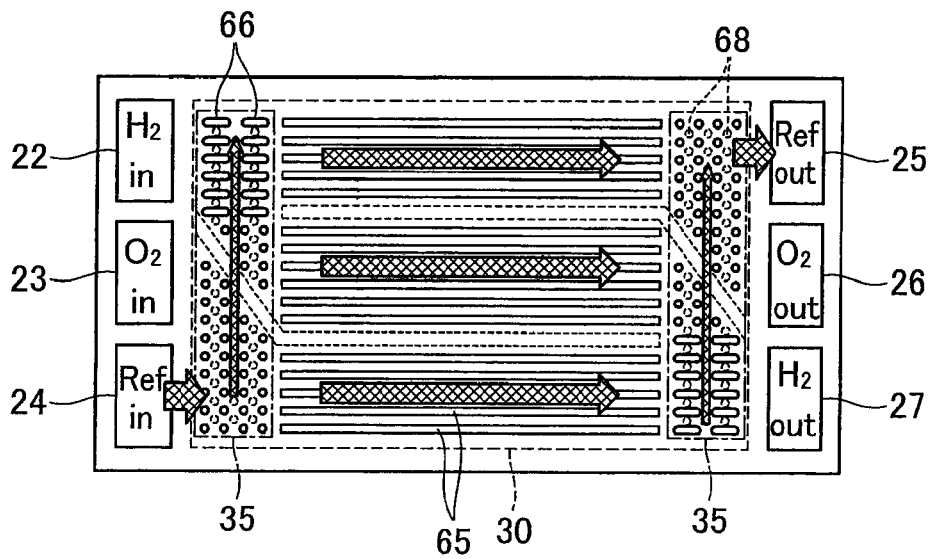

FIG. 9 is plan views showing the structure of the separator 215 included in the fuel cell of the third embodiment. FIG. 10 is plan views showing the structure of the separator 216 included in the fuel cell of the third embodiment. FIGS. 9(A) and 10(A) show gas flow path sides, and FIGS. 9(B) and 10(B) show refrigerant flow path sides. The layout of the manifolds for the respective fluids, the shapes of the convexes provided on the gas flow path side, and the flow directions of the fuel gas and the oxidation gas on the gas flow path side in the third embodiment are equivalent to those in the first embodiment.

In the separators 215 and 216 of the third embodiment, projections 42, 46, 62, or 66 provided on the flow distribution areas 35 (including the inflow outflow areas 33 and the connection areas 34) include projections of circular cross sections arranged at fixed intervals, which are similar to the projections of the circular cross section in the first embodiment, and long projections having a shape of connecting a preset number of plural locations set for formation of the projections of the circular cross section, in place of the projections having the cross sections of the larger diameter in the first embodiment. The layout of the projections of the circular cross section arranged at the fixed intervals in the structure of the third embodiment is different from the layout of the similar projections in the structure of the first embodiment. As shown in FIGS. 9 and 10, the projections 42, 46, 62, or 66 are aligned in a grid-like pattern to have equal intervals both in the horizontal direction and in the vertical direction. The projections formed on one side and the projections formed on the other side are provided in such a relation as to avoid mutual interference with the opposed lines of the projections arranged in the horizontal direction and in the vertical direction. Among the projections 46 or 66 protruded on the refrigerant flow path side, each of the long projections provided instead of the larger diameter projections of the first embodiment is formed in the shape of connecting two adjacent locations in the horizontal direction set for formation of the projections of the circular cross section in the grid-like pattern (see FIGS. 9(B) and 10(B)).

Like the structure of the first embodiment, in the structure of the third embodiment, a set of holes 24 formed in the vicinity of a vertically lower end of the upstream flow distribution area 35 define a refrigerant supply manifold. A set of holes 25 formed in the vicinity of a vertically upper end of the downstream flow distribution area 35 define a refrigerant discharge manifold. As in the structure of the first embodiment, the parted regions 32a and 32c are the areas with the relatively high flow rate of the refrigerant according to the positional relation to the manifolds (high refrigerant flow rate areas).

The projections 46 or 66 are formed in a long shape having a longitudinal direction parallel to the horizontal direction (flattened shape) in specific sections of the flow distribution areas 35 arranged to supply and discharge the refrigerant from and to the high refrigerant flow rate area or specific sections of the flow distribution areas 35 corresponding to the high refrigerant flow rate area (specific sections of the flow distribution areas 35 having the same relative position in the vertical direction as that of the high refrigerant flow rate area). The specific sections with the flattened projections 46 or 66 have the smaller flow path sectional area in the horizontal direction and thereby the higher flow path resistance of the refrigerant flow in the vertical direction.

In the flow distribution area 35 on the side of the hole 24 (upstream flow distribution area), the flattened projections 46 or 66 are formed in an upper region apart from the hole 24 in the vertical direction. The upper region in the vertical direction of the upstream flow distribution area 35 accordingly has the higher flow path resistance of the refrigerant flow in the vertical direction. This arrangement lowers the flow rate of the vertically upward refrigerant flow in the upstream flow distribution area 35 and inhibits the inflow of the refrigerant to the parted region 32a. In the flow distribution area 35 on the side of the hole 25 (downstream flow distribution area), the flattened projections 46 or 66 are formed in a lower region apart from the hole 25 in the vertical direction. The lower region in the vertical direction of the downstream flow distribution area 35 accordingly has the higher flow path resistance of the refrigerant flow in the vertical direction. This arrangement restricts the upward flow of the refrigerant in the vertical direction from a vertically lower end section of the downstream flow distribution area 35. The restricted flow of the refrigerant discharged from the parted region 32c to the downstream flow distribution area 35 inhibits the inflow of the refrigerant to the parted region 32c. This increases the inflow amount of the refrigerant to the parted region 32b in the center area of the power generation area 30, thus making the substantially equal amounts of the refrigerant flowed into the respective parted regions 32a through 32c and equalizing the flow rate distribution of the refrigerant flowing over the flow distribution areas 35. The flow rate of the refrigerant can thus be equalized over the whole power generation area 30 including the three parted regions 32a through 32c and the two flow distribution areas 35.

In the structure of the third embodiment, each of the flattened projections 46 or 66 is designed to have the long shape of connecting two adjacent locations set for formation of the projections 46 or 66 of the circular cross section in the grid-like pattern while avoiding interference with locations set for formation of the projections 42 or 62 on the gas flow path side. This arrangement restricts the influence of the flattened projections 46 or 66 on the shape and the layout of the projections 42 or 62 on the gas flow path side and the gas flow on the gas flow path side.

In the structure of the third embodiment, the flattened projections 46 or 66 are formed in the long shape of connecting the two adjacent locations set for formation of the projections 46 or 66 of the circular cross section in the grid-like pattern. This shape is, however, neither essential nor restrictive. The flattened projections 46 or 66 may be formed in a shape of connecting three or a greater number of adjacent locations set for formation of the projections 46 or 66 of the circular cross section. The flattened projections 46 or 66 may be formed in a shape of connecting a preset number of adjacent locations set for formation of the projections 46 or 66 of the circular cross section in a selected direction different from the horizontal direction in some regular pattern. For example, in the layout of the projections 46 or 66 of the circular cross section at the fixed intervals as discussed in the first embodiment, connecting a preset number of adjacent locations set for formation of the projections 46 or 66 with avoiding interference with locations set for formation of the recesses 43 or 63 gives projections having an angle of approximately 45 degrees relative to the horizontal direction. The flattened projections 46 or 66 may be formed in any shape of connecting a preset number of adjacent locations set for formation of the projections 46 or 66 of the circular cross section arranged at fixed intervals in a regular pattern, as long as the shape ensures an increase in resistance to the refrigerant flow in the vertical direction in the flow distribution areas 35. The formation of such flattened projections 46 or 66 with avoiding interference with the locations set for formation of the recesses 43 or 63 restricts the influence of the flattened projections 46 or 66 on the gas flow path side.

D. Other Aspects

The embodiments and their applications discussed above are to be considered in all aspects as illustrative and not restrictive. There may be many modifications, changes, and alterations without departing from the scope or spirit of the main characteristics of the present invention. Some examples of possible modification are given below.

D1. Modified Example 1

In the structures of the first through the third embodiments discussed above, the two different sizes or different shapes of the projections 46 or 66 are used to vary the flow path resistance by location in the flow distribution areas 35. In one modified structure, projections of three or a greater number of different sizes or different shapes may be formed in the flow distribution area 35 to control the flow path resistance. For example, the size of the projections 46 or 66 may be gradually expanded toward the high refrigerant flow rate areas. In the structure of varying the size or the shape of the projections 46 or 66 in part of each flow distribution area 35 as in the structures of the first through the third embodiments, the high refrigerant flow rate area may be set to be wider in area or to be narrower in area than each of the parted regions 32a through 32c. On the refrigerant flow path area, the refrigerant flow generally runs straight in parallel to the horizontal direction, while the respective parted regions 32 are actually not separated from one another. Namely there is no stepwise change in flow rate of the refrigerant between the respective parted regions 32. The boundary of the region with the projections having the shape of increasing the resistance to the refrigerant flow in the vertical direction may thus be different from the boundary between the adjacent parted regions 32.

D2. Modified Example 2

In the structures of the first through the third embodiments discussed above, the projections 46 or 66 in the shape of increasing the flow path resistance are formed in part of the flow distribution areas 35, while the layout pattern of the projections 46 or 66 arranged at the fixed intervals is maintained. This approach is, however, neither essential nor restrictive. Another approach may enhance the density of the projections 46 or 66 in a selected section of the flow distribution area 35 to be higher than the density of the projections 46 or 66 in the other residual section of the flow distribution area 35, with a view to partially increasing the resistance to the refrigerant flow. Such formation of the projections 46 or 66 with avoiding interference with the locations set for formation of the recesses 43 or 63 arranged in a regular pattern substantially equalizes the flow rate distribution of the refrigerant, while restricting the influence on the gas flow path side.

D3. Modified Example 3

In the structures of the first embodiment and the second embodiment discussed above, the projections 46 or 66 are formed to have the circular cross section. The cross section of the projections is not restricted to the circular shape but may be any other suitable shape, for example, a polygonal shape having substantially equal lengths in the vertical direction and in the horizontal direction. In this modified structure, the lengths or the diameters of the polygonal cross sections of the projections in the vertical direction and in the horizontal direction (in the projections of a rectangular cross section, the length of one side or the length of a diagonal of the rectangular cross section) may be varied by location as in the structures of the first embodiment and the second embodiment. This modified arrangement varies the flow path resistance to the refrigerant flow in the vertical direction in the flow distribution areas.

D4. Modified Example 4

In the structures of the first embodiment and the third embodiment discussed above, the specific sections with the projections 42 or 46 of enhancing the resistance to the refrigerant flow in the vertical direction in the flow distribution areas 35 are provided in the area close to the hole 22 and in the area close to the hole 27. In the flow distribution areas 35, an area close to the hole 24 and an area close to the hole 25 (expressed as an area 36 and an area 37 in FIG. 3) are also the specific sections of the flow distribution areas 35 corresponding to the high refrigerant flow rate areas (the parted regions 32a and 32c). Formation of the larger diameter projections 46 and 66 in these areas 36 and 37 similarly restricts the flow rate of the refrigerant flowing through the parted regions 32a and 32c as the high refrigerant flow rate areas. Enhancing the flow path resistance in the area close to the refrigerant manifold increases the potential pressure loss of the refrigerant flow and restricts the flow rate of the refrigerant in the parted region 32b as an area having a relatively low flow rate of the refrigerant (low refrigerant flow rate area) according to the positional relation to the refrigerant manifold. This restricted flow rate makes it difficult to attain the substantially uniform flow rate distribution of the refrigerant. In the layout of the refrigerant manifolds located diagonally outside the power generation area 30 or at a vertically lower end corner and at a vertically upper end corner on the opposite sides, each specific section with multiple projections of enhancing the resistance to the refrigerant flow in the vertical direction is preferably provided at such a location as to avoid interference with the refrigerant flow to the low refrigerant flow rate area. As in the structures of the first embodiment and the third embodiment discussed above, multiple projections of enhancing the resistance to the refrigerant flow in the vertical direction are desirably formed in specific sections apart from the refrigerant manifolds in the flow distribution areas 35.

D5. Modified Example 5

In the structures of the first through the third embodiments discussed above, the gas flow path formed on the gas flow path side is arranged to reverse the direction of the gas flow in each connection area 34. In one modified structure, the gas flow path may be arranged to make a straight gas flow in one direction, like the refrigerant flow in the refrigerant flow path. In this modified arrangement of the gas flow path to make the straight gas flow in one direction, it is required to supply and discharge a fluid flow from and to fluid manifolds provided at different locations in the vicinity of the outer circumference of the straight flow path area on each side of the separator. In the modified arrangement of the gas flow path to make the straight gas flow in one direction on a separator having concavo-convex structures in a mutually reversed relation on its surface and on its rear side, it is essential to provide a flow distribution area with multiple projections formed on both sides at a location in the vicinity of a hole for each fluid manifold on the separator. The technique of the invention is applicable to provide such flow distribution areas. In the modified arrangement of the gas flow path to make the straight gas flow in one direction, formation of projections having the shape and the layout similar to those of the projections in any of the above embodiments in each flow distribution area on the gas flow path side of the separator effectively attains a substantially uniform in-plane distribution of the gas flow rate.

What is claimed is:

1. A gas separator for a fuel cell configured to have concavo-convex structures formed in a mutually reversed relation on two sides thereof and to define a flow path for a first fluid on a first side thereof and a flow path for a second fluid on a second side thereof, the gas separator comprising:

a center area designed to have therein multiple linear convexes, which are extended in a first direction to introduce the first fluid and the second fluid in the first direction on the respective sides and are arranged to make a flow of the first fluid in one fixed direction on at least the first side, the center area being arranged to cause non-uniformity of a flow rate distribution of the first fluid based on a relation to a flow direction of the first fluid on the first side; and flow distribution areas arranged across the center area to be adjacent to respective ends of the multiple linear convexes and designed to have multiple first projections of a circular cross section that are protruded from the first side to be arranged apart from one another at a preset interval, and multiple second projections that are protruded from the second side to be arranged apart from one another, each of the flow distribution areas being structured to make a flow of the first fluid to be supplied from or discharged to the flow path of the first fluid formed in the center area on the first side, wherein the first fluid on the first side is made to flow from a region close to one end section in a direction perpendicular to the first direction of one flow distribution area to a region close to an opposed end section in the direction perpendicular to the first direction of the other flow distribution area, in the one flow distribution area, a plurality of the first projections formed in a region close to the opposed end section in the direction perpendicular to the first direction are designed to have a larger diameter of the cross section than the plurality of the first projections formed in another region, and in the other flow distribution area, the plurality of the first projections formed in a region close to the one end section in the direction perpendicular to the first direction are designed to have a larger diameter of the cross section than the plurality of the first projections formed in another region.

2. A fuel cell, comprising:

a power generation assembly structured to have an electrolyte layer and a pair of electrodes formed on respective sides of the electrolyte layer; and a pair of the gas separators for the fuel cell in accordance with claim 1 arranged across the power generation assembly to define flow paths for reactive gases between the respective gas separators and the power generation assembly.

3. A gas separator for a fuel cell configured to have concavo-convex structures formed in a mutually reversed relation on two sides thereof and to define a flow path for a first fluid on a first side thereof and a flow path for a second fluid on a second side thereof, the gas separator comprising:

a center area designed to have therein multiple linear convexes, which are extended in a first direction to introduce the first fluid and the second fluid in the first direction on the respective sides and are arranged to make a flow of the first fluid in one fixed direction on at least the first side, the center area being arranged to cause non-uniformity of a flow rate distribution of the first fluid based on a relation to a flow direction of the first fluid on the first side; and flow distribution areas arranged across the center area to be adjacent to respective ends of the multiple linear convexes and designed to have multiple first projections of a circular cross section that are protruded from the first side to be arranged apart from one another at a preset interval, and multiple second projections that are protruded from the second side to be arranged apart from one another, each of the flow distribution areas being structured to make a flow of the first fluid to be supplied from or discharged to the flow path of the first fluid formed in the center area on the first side, wherein the first fluid on the first side is from a region close to a central section in a direction perpendicular to the first direction of the one flow distribution area to a region close to a central section in the direction perpendicular to the first direction of the other flow distribution area, and in each of the flow distribution areas, the plurality of the first projections formed in the region close to the central section in the direction perpendicular to the first direction are designed to have a larger diameter of the cross section than the plurality of the first projections formed in a region close to an end section in the direction perpendicular to the first direction.

4. A gas separator for a fuel cell configured to have concavo-convex structures formed in a mutually reversed relation on two opposed sides thereof and to define a flow path for a first fluid on a first side thereof and a flow path for a second fluid on a second side thereof, the gas separator comprising:

a center area designed to have therein multiple linear convexes, which are extended in a first direction to introduce the first fluid and the second fluid in the first direction on the respective opposed sides and are arranged to make a flow of the first fluid in one fixed direction on at least the first side;

flow distribution areas arranged across the center area to be adjacent to respective ends of the multiple linear convexes and designed to have multiple first projections of a circular cross section that are protruded from the first side to be arranged apart from one another at a preset interval, and multiple second projections that are protruded from the second side to be arranged apart from one another, each of the flow distribution areas being structured to make a flow of the first fluid to be supplied from or discharged to the flow path of the first fluid formed in the center area on the first side;

a first port formed in one end section in a direction perpendicular to the first direction of one of the flow distribution areas or one flow distribution area to connect with the one flow distribution area; and a second port formed in an opposed end section in the direction perpendicular to the first direction of the other of the flow distribution areas or the other flow distribution area to connect with the other flow distribution area, where in each of the flow distribution areas, a plurality of the first projections formed in a region apart from either the first port or the second port is designed to have a larger diameter of the cross section than a plurality of the first projections formed in a region close to either the first port or the second port.

5. A fuel cell, comprising:
a power generation assembly structured to have an electrolyte layer and a pair of electrodes formed on respective sides of the electrolyte layer; and
a pair of the gas separators for the fuel cell in accordance with claim 4 arranged across the power generation assembly to define flow paths for reactive gases between the respective gas separators and the power generation assembly.

6. A gas separator for a fuel cell configured to have concavo-convex structures formed in a mutually reversed relation on two sides thereof and to define a flow path for a first fluid on a first side thereof and a flow path for a second fluid on a second side thereof,
the gas separator comprising:
a center area designed to have therein multiple linear convexes, which are extended in a first direction to introduce the first fluid and the second fluid in the first direction on the respective sides and are arranged to make a flow of the first fluid in one fixed direction on at least the first side;
flow distribution areas arranged across the center area to be adjacent to respective ends of the multiple linear convexes and designed to have multiple first projections of a circular cross section that are protruded from the first side to be arranged apart from one another at a preset interval, and multiple second projections that are protruded from the second side to be arranged apart from one another, each of the flow distribution areas being structured to make a flow of the first fluid to be supplied from or discharged to the flow path of the first fluid formed in the center area on the first side;
a first port formed in a central section in a direction perpendicular to the first direction of one of the flow distribution areas or one flow distribution area to connect with the one flow distribution area; and
a second port formed in a central section in the direction perpendicular to the first direction of the other of the flow distribution areas or the other flow distribution area to connect with the other flow distribution area,
where in each of the flow distribution areas, a plurality of the first projections formed in a region close to either the first port or the second port is designed to have a larger diameter of the cross section than a plurality of the first projections formed in a region apart from either the first port or the second port.

7. A fuel cell, comprising:
a power generation assembly structured to have an electrolyte layer and a pair of electrodes formed on respective sides of the electrolyte layer; and
a pair of the gas separators for the fuel cell in accordance with claim 6 arranged across the power generation assembly to define flow paths for reactive gases between the respective gas separators and the power generation assembly.

* * * * *